Figures 1, 2, 3:
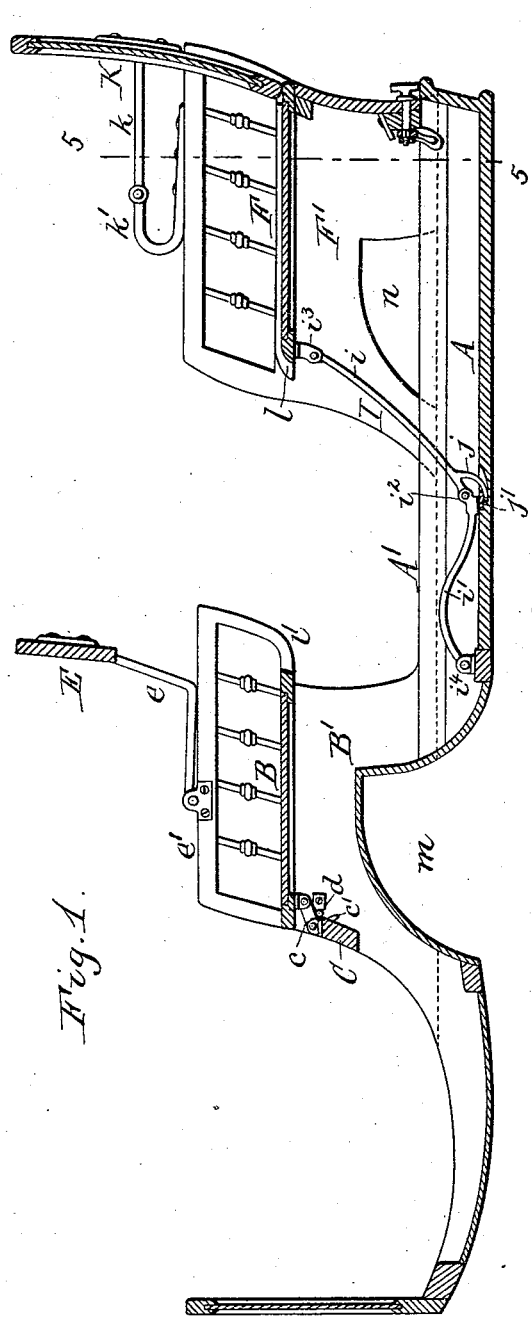

(No Model.) 2 Sheets—Sheet 1.

F. MEYER.
CONVERTIBLE CARRIAGE.

No. 509,385. Patented Nov. 28, 1893.

Witnesses:
Emil Neuhart
Theo. L. Popp

Fredrick Meyer  Inventor.
By Wilhelm Bonner
  Attorneys.

(No Model.)　　　　　　　　　　　　　　　　　　2 Sheets—Sheet 2.
F. MEYER.
CONVERTIBLE CARRIAGE.
No. 509,385.　　　　　　　　　　Patented Nov. 28, 1893.
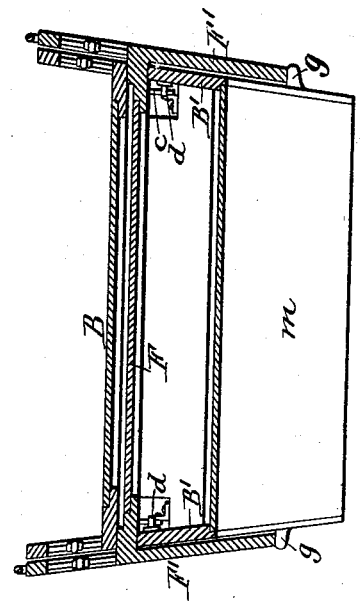
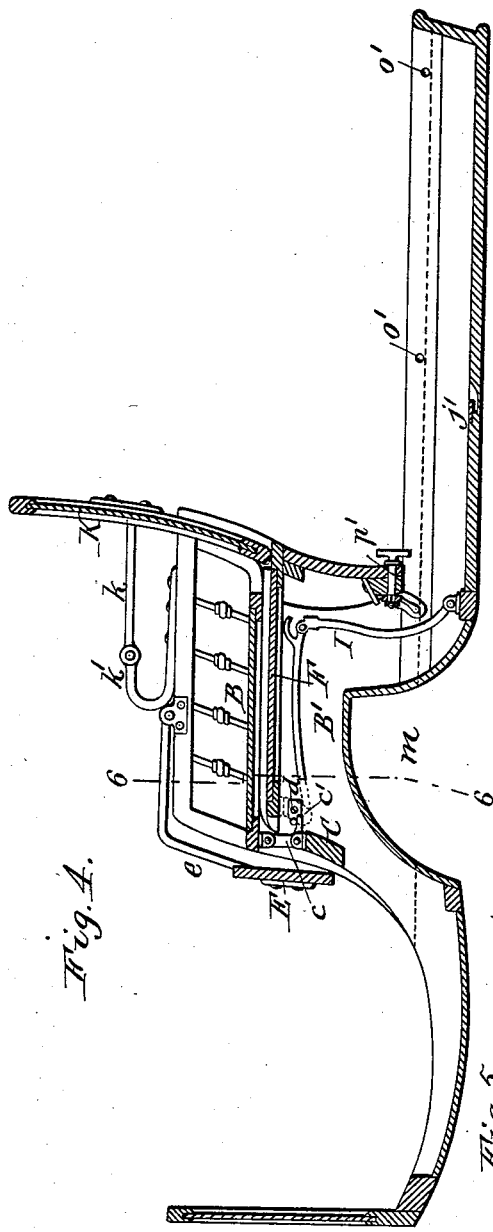
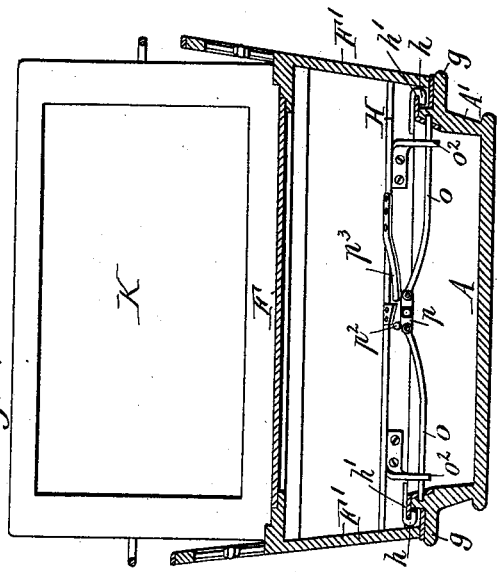

UNITED STATES PATENT OFFICE.

FREDERICK MEYER, OF BUFFALO, NEW YORK.

CONVERTIBLE CARRIAGE.

SPECIFICATION forming part of Letters Patent No. 509,385, dated November 28, 1893.

Application filed February 28, 1893. Serial No. 464,070. (No model.)

*To all whom it may concern:*

Be it known that I, FREDERICK MEYER, a citizen of the United States, residing at Buffalo, in the county of Erie and State of New York, have invented new and useful Improvements in Convertible Carriages, of which the following is a specification.

This invention relates to convertible carriages in which the seats may be placed one under the other to form a one seated carriage, or both arranged to face forward to form an ordinary two seat carriage or placed back to back to form a dos-a-dos carriage. My invention has more special reference to vehicles of this class in which the rear seat slides forward under the front seat.

One of the objects of my invention is to so construct the carriage that when both seats are arranged to face forward, or are placed dos-a-dos the rear seat is on a level with the front seat or at the same elevation above the body, thus preserving the symmetry and sightliness of the vehicle.

My invention has the further objects to provide such a construction of the convertible vehicle, as will permit the front portion of the body to be recessed, to allow the front wheels to pass under the same and thereby make a shorter turn, and finally to provide a simple and convenient device for locking the sliding rear seat in place.

In the accompanying drawings consisting of two sheets:—Figure 1 is a longitudinal sectional elevation of my improved vehicle, showing the rear seat behind the front seat, and both seats facing forward. Fig. 2 is a similar view showing the seats arranged back to back. Fig. 3 is a fragmentary perspective view, on an enlarged scale, of the means for limiting the vertical movement of the front seat. Fig. 4 is a longitudinal sectional elevation of the carriage, showing the rear seat under the front seat, forming a one seat vehicle. Fig. 5 is a cross section in line 5—5, Fig. 1, looking backward. Fig. 6 is a cross section in line 6—6, Fig. 4, looking forward.

Like letters of reference refer to like parts in the several figures.

A represents the rectangular body or box of the vehicle having upright side walls A'.

B is the front seat which is supported upon fixed standards or upright side pieces B' rising from the side walls of the body. This seat rests with its rear portion loosely upon its standards, while its front portion is attached to the standards by connections, which while permanently uniting the seat to the standards, permit the front portion of the seat to rise above the upper ends of its standards. In the construction shown in the drawings these connections consist of links $c$ arranged near opposite ends of the seat and each pivoted at its upper end to the under side of the seat, and at its lower end to a cross bar C connecting the seat standards. Each of these links is provided with a rearwardly extending stout arm $c'$ which strikes against the under side of a horizontal pin or projection $d$ secured to the inner side of the adjacent side wall of the carriage body when the seat is sufficiently elevated above the standard, thereby preventing the seat from moving forwardly beyond such position.

E is the back of the forward seat which is supported by angular arms $e$ pivoted at their lower ends to the side rails $e'$ of the seat. These arms are so bent and are of such a length that the back may be folded forward and downward against the front sides of the seat standards, as shown in Fig. 4. In the normal position of this back the elbows of the supporting arms rest upon the side rails of the seat.

F represents the rear seat of the carriage which is secured to the upper ends of standards or upright side pieces F'. These standards are arranged on the outer side of the carriage body, and slide upon longitudinal ways or supporting ledges $g$ secured to the outer sides of the body walls, near the upper edges thereof; as shown in Figs. 5 and 6. These supporting ledges extend from the rear end of the body to a short distance in advance of the rear portion of the forward seat.

$h$ represents hooks whereby the rear portions of the rear seat standards are held down upon their supporting ways. These hooks are secured to a cross bar H connecting the standards F', and embrace longitudinal rails or flanges $h'$ projecting laterally from the upper edges of the side walls of the body, as clearly shown in Fig. 5. These hooks, while retaining the standards upon the rails $h'$, permit the same to slide freely toward and from the front seat. The front portion of the rear seat is held down upon the supporting ways $g$ by folding braces I arranged at opposite ends of the seat and composed of two arms or members $i\ i'$ hinged together at $i^2$. The upper member of each of these braces is pivoted at its upper end to a lug or ear $i^3$ secured to the under side of the rear seat, and the lower arm of the brace is pivoted at its front end to a similar lug $i^4$ secured to the bottom of the body, as shown in Figs. 1 and 2.

$j$ is a catch arranged on the under side of the folding brace, at or near its hinge and engaging with the bottom of the body, so as to resist the upward movement of the brace. This catch preferably consists of a prong or finger projecting downwardly and forwardly from the brace and engaging under an overhanging lip or plate $j'$, arranged in a recess formed in the bottom of the body, as shown in Fig. 1.

K is the back of the rear seat which is supported by horizontal arms $k$ pivoted at their inner ends to raised supports $k'$ secured to the side rails of the seat. The pivots of the supporting arms $k$ are arranged centrally on the side rails of the seat, so that the back may be swung across the rear of the seat, as shown in Figs. 1 and 4 or across the front thereof, as shown in Fig. 2.

When it is desired to use the carriage with two seats both facing forward, the rear seat is shifted to the rear end of the body, and its back is swung across the rear side of the seat, as shown in Fig. 1. When a dos-a-dos carriage is desired, the rear seat is shifted forward against the front seat and the back of the rear seat is reversed, as shown in Fig. 2. The standards of the front seat are flush with the outer surface of the side walls of the body, and as the standards of the rear seat are on the outside of the body, they are capable of passing by the front seat standards, as indicated by dotted lines in Fig. 2. During the first part of this forward movement of the rear seat its front portion is caused to rise or jump from the supporting ways $g$, until the upper arms of the folding braces I pass forward beyond a perpendicular line passing through the hinges of the braces, when the seat again descends to its normal position, and its standard remains in contact with the guide ways during the remainder of its forward movement. In order to permit the seat to tilt or jump in this manner its retaining hooks $h$ are loosely fitted to the rails $h'$, so as to act as pivots on which the seat rocks freely.

In case it is desired to convert the vehicle into a one seat carriage, the back of the front seat is swung forward and downward in front of said seat, and the back of the rear seat is swung across the rear portion of the same. The rear seat is then shifted forward under the front seat, as shown in Fig. 4, the link $c$ of the front seat permitting the latter to rise bodily above the upper ends of its standards, so as to allow the rear seat to occupy the space formerly occupied by the front seat. In order to cause the front seat to be thus elevated by the forward movement of the rear seat the front edge of the rear seat is curved or inclined as shown at $l$, and the rear edge of the front seat is correspondingly curved or beveled as shown at $l'$, so that the beveled edge of the rear seat coming in contact with the beveled edge of the front seat, lifts the rear portion of the latter sufficiently to pass under it, when the continued forward movement of the rear seat causes the front portion of the forward seat to be likewise elevated. The connecting links $c$ of the front seat are made long enough to permit it to rise sufficiently to allow the rear seat to pass under it. When the seats are in this position, the rear seat rests upon the upper ends of the front seat standards and the front seat rests upon the rear seat. To allow the side rails of the rear seat to pass outside of the corresponding rails of the front seat, the former rails are arranged farther apart than the latter, as shown in Fig. 6.

The arrangement of the rear seat standards on the outer sides of the front seat standards permits the carriage body to be recessed or raised underneath the front seat, as shown at $m$, thus allowing the front wheels to pass under the body without interference and enabling the carriage to make a short turn. When the body is thus constructed the standards of the rear seat are formed with a recess $n$ of the same size and outline as the recess in the body, so that when the rear seat is shifted under the front seat the recesses of the body and the rear seat standards coincide. The latter thus permit the front wheels to pass under the body and at the same time present the appearance of being a part of the body.

By arranging the front seat to rise bodily from its supports, as before described, the rear seat may be level with or in the normal plane of the front seat, whereby a symmetrical appearance of the carriage is maintained, which renders the same more sightly than a carriage in which one seat is higher than the other.

In shifting the rear seat to the extreme rear end of the body to form an ordinary two-seated carriage, the front portion of the seat is caused to rise or jump as before described until the upper arms of the braces I pass rearwardly beyond a perpendicular line passing through their hinges, when the seat is again allowed to fall to its normal position.

The rear seat is preferably locked in each of its three positions to prevent its accidental displacement. For this purpose said seat is provided at its rear portion with two transverse sliding locking bolts or rods $o$, which enter one of the three sets of openings or recesses $o'$ formed in the inner sides of the side walls of the body, as shown in Fig. 5. These openings are arranged at the proper points in the body to receive the locking bolts in the three positions of the shifting seat, as shown in Figs. 2 and 4. The locking bolts o are guided in perforated ears o² depending from the cross bar H of the rear seat, and are pivoted at their inner ends to opposite ends of a shifting lever p pivoted centrally to said cross bar, so that upon turning the lever into its horizontal position the bolts are moved outward in opposite directions and interlock with the openings in the body, while upon turning the lever into its upright position, the bolts are retracted and the seat is released. The shifting lever is secured to the inner end of a rock shaft p' passing rearwardly through the cross bar H and having at its rear end a handle for turning it.

p² is a stop arranged on the cross bar H, for limiting the movement of the shifting lever, and p³ is a retaining spring for holding the lever in the proper position to lock the bolts o. This spring is flat and secured to the cross bar, and its free end bears against the adjacent arm of the shifting lever. Upon retracting the locking bolts against the pressure of this spring, and releasing the handle of the shifting lever, the bolts shifting the seats are caused to automatically engage with a set of openings in the body as soon as they arrive opposite such openings.

Any other suitable locking device may be employed instead of that herein shown.

I claim as my invention—

1. In a convertible carriage, the combination with the body, of a front seat capable of rising from its supports both at its front and rear portions, and a rear seat arranged in the normal plane of the front seat and capable of sliding forward under the front seat, whereby the latter is bodily raised above its supports, while the rear seat occupies the position normally occupied by the front seat, substantially as set forth.

2. In a convertible carriage, the combination with the body, of front seat supports, a seat resting loosely on said supports both at its front and rear portions, loose connections uniting said seat with its supports, and permitting the seat to rise bodily above said supports, and a sliding rear seat adapted to be shifted under the front seat, substantially as set forth.

3. In a convertible carriage, the combination with the body, of front seat supports, a seat resting loosely on said supports both at its front and rear portions, loose connections uniting said seat with its supports and permitting the seat to rise bodily above said supports, a sliding rear seat adapted to be shifted under the front seat, and lifting inclines arranged on the rear portion of the front seat and on the front portion of the rear seat, substantially as set forth.

4. In a convertible carriage, the combination with the body, of front seat supports, a seat resting loosely on said supports both at its front and rear portions, pivoted links connecting the front portion of said seat with its standards, and a sliding rear seat adapted to be shifted under the front seat, substantially as set forth.

5. In a convertible carriage, the combination with the body provided on its outer side with longitudinal ways or ledges, of front seat supports, a front seat resting on said supports and capable of rising bodily from the same, and a rear seat having supports arranged on the outer sides of the carriage body and sliding upon said ways or ledges, the rear seat being adapted to be shifted under the vertically movable front seat and support the latter, substantially as set forth.

6. In a convertible carriage, the combination with the body provided in its lower front portion with a recess for receiving the front wheels of the carriage, and on its outer side with longitudinal ways, of front seat supports rising from the recessed portion of the body, a seat resting loosely on said supports and capable of rising bodily therefrom, sliding rear seat-supports supported on the external ways of the body and provided with recesses adapted to coincide with the recesses of the body, and a rear seat resting on said sliding supports, substantially as set forth.

7. In a convertible carriage, the combination with the body and a front seat supported thereon, of ways arranged on the body, a rear seat sliding on said ways toward and from the front seat, retaining devices for holding the rear portion of the rear seat down on its ways, and a pivoted brace connecting the front portion of the rear seat with the body, and having a catch engaging with the bottom of the carriage body, for restraining the upward movement of the rear seat, substantially as set forth.

8. In a convertible carriage, the combination with the body, and a front seat supported thereon, of ways arranged on the body, a rear seat sliding on said ways toward and from the front seat, retaining devices for holding the rear portion of the rear seat down on its ways, a locking lip or plate arranged in a recess in the bottom of the carriage body, and a folding brace having a prong or finger which engages with said locking lip or plate, substantially as set forth.

9. In a convertible carriage, the combination with the body having longitudinal rails or flanges, of a front seat, a rear seat sliding on the body toward and from the front seat and having retaining hooks which embrace said rails or flanges, and which permit the front portion of said seat to rock or tilt upward, and a folding brace composed of an upper member pivoted to the front of the rear seat, and a lower member pivoted to the carriage body, substantially as set forth.

Witness my hand this 24th day of February, 1893.

FREDERICK MEYER.

Witnesses:
JNO. J. BONNER,
FRED. C. GEYER.